Figure 1:
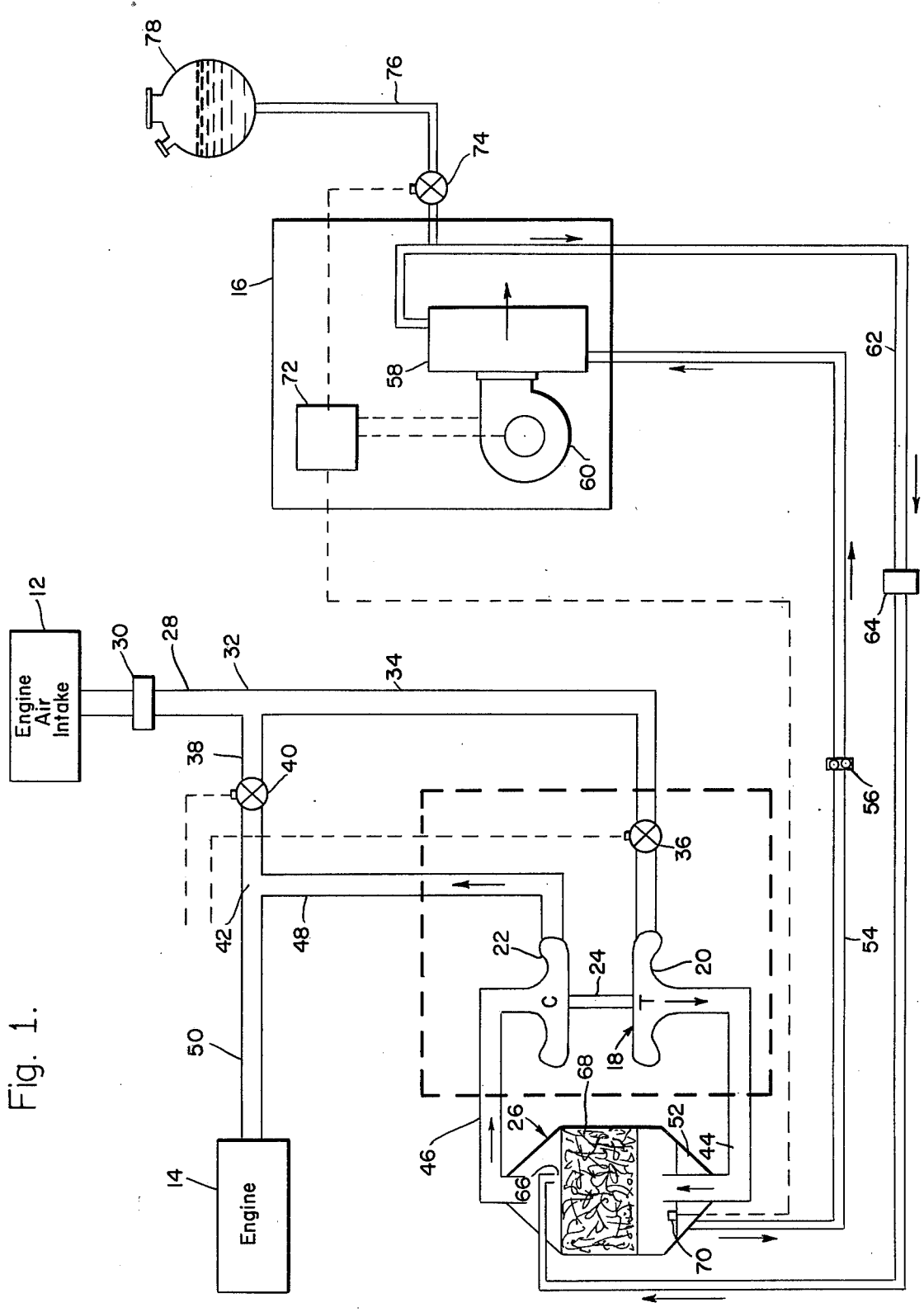

United States Patent

Iles et al.

[11] 4,014,179
[45] Mar. 29, 1977

[54] AIR CONDITIONING SYSTEM FOR AIRCRAFT

[75] Inventors: Thomas L. Iles; Kwang-Chou Hwang, both of Rancho Palos Verdes; Robert C. Kinsell, Los Angeles, all of Calif.

[73] Assignee: The Garrett Corporation, Los Angeles, Calif.

[22] Filed: Aug. 29, 1975

[21] Appl. No.: 609,127

[52] U.S. Cl. .................................. 62/88; 62/96; 62/172; 62/402; 62/DIG. 5; 123/119 CD; 60/599

[51] Int. Cl.² .................................. F25B 9/00

[58] Field of Search ............ 62/86, 87, 88, 89, 90, 62/91, 96, 172, 401, 402, DIG. 5; 123/119 CD; 98/1.5; 60/599

[56] References Cited

UNITED STATES PATENTS

| | | | |
|---|---|---|---|
| 1,935,186 | 11/1933 | King | 123/119 CD |
| 2,526,103 | 10/1950 | Wood | 62/87 X |
| 2,734,443 | 2/1956 | Wood | 62/172 X |
| 2,767,561 | 10/1956 | Seeger | 62/87 X |
| 3,208,234 | 9/1965 | Messinger | 62/402 X |

*Primary Examiner*—Ronald C. Capossela
*Attorney, Agent, or Firm*—Joel D. Talcott; Albert J. Miller

[57] ABSTRACT

Inlet air for an internal combustion engine in an airplane is expanded through a turbine to lower its pressure and temperature and is passed through a water chiller wherein heat exchange and evaporative cooling substantially lower the temperature of the water. The air is then fed to a compressor driven by the turbine and its pressure is raised to a level suitable for input to the engine manifold. The chilled water is circulated through a heat exchanger to provide cooling for the cabin of the airplane.

14 Claims, 2 Drawing Figures

AIR CONDITIONING SYSTEM FOR AIRCRAFT

This invention relates to air conditioning systems and, more particularly, to an air cycle air conditioning system which may be used in propeller type aircraft and which is well suited for use in aircraft powered by a single engine or by multiple wing mounted reciprocating piston engines.

Heretofore, it has not been practical to use air conditioning systems in single propeller type aircraft. Further, air conditioning systems for airplanes having multiple engines of the reciprocating piston type have required a substantial mount of power for their operation. This was a general result of the fact that the air conditioning systems utilized in such applications were of the vapor cycle variety now normally used in automobiles and home installations. Air cycle air conditioning systems which generally utilize less power have not been used in piston engine aircraft because available systems required high pressure bleed air which is generally only available in aircrafts having turbine type engines.

In accordance with this invention, an air cycle air conditioning system is provided which has extremely low power requirements and can be utilized in piston engine powered, propeller driven airplanes. Engine inlet air at substantially ambient pressure is expanded and cooled through a turbine. This air is then passed through a water chiller into which an ample amount of water is sprayed. The low pressure air has an extremely high capacity for water vapor so that a high rate of evaporative cooling occurs in the water chiller. The remaining water is greatly cooled and is pumped through a heat exchanger that provides cooled air to the cabin.

The low pressure air passes from the water chiller through a compressor which is powered solely by the expansion turbine and raises the air to a sufficiently high pressure to be fed into the intake manifold of the airplane engine. Throttle controls may be used to by-pass the air conditioning system when substantial amounts of inlet air must be fed into the intake manifold during high power operation.

In multiple engine airplanes, more than one air conditioning system may be used and, if desired, the chilled water from the two systems may be combined and pumped through a single cabin heat exchanger.

Figure 2:
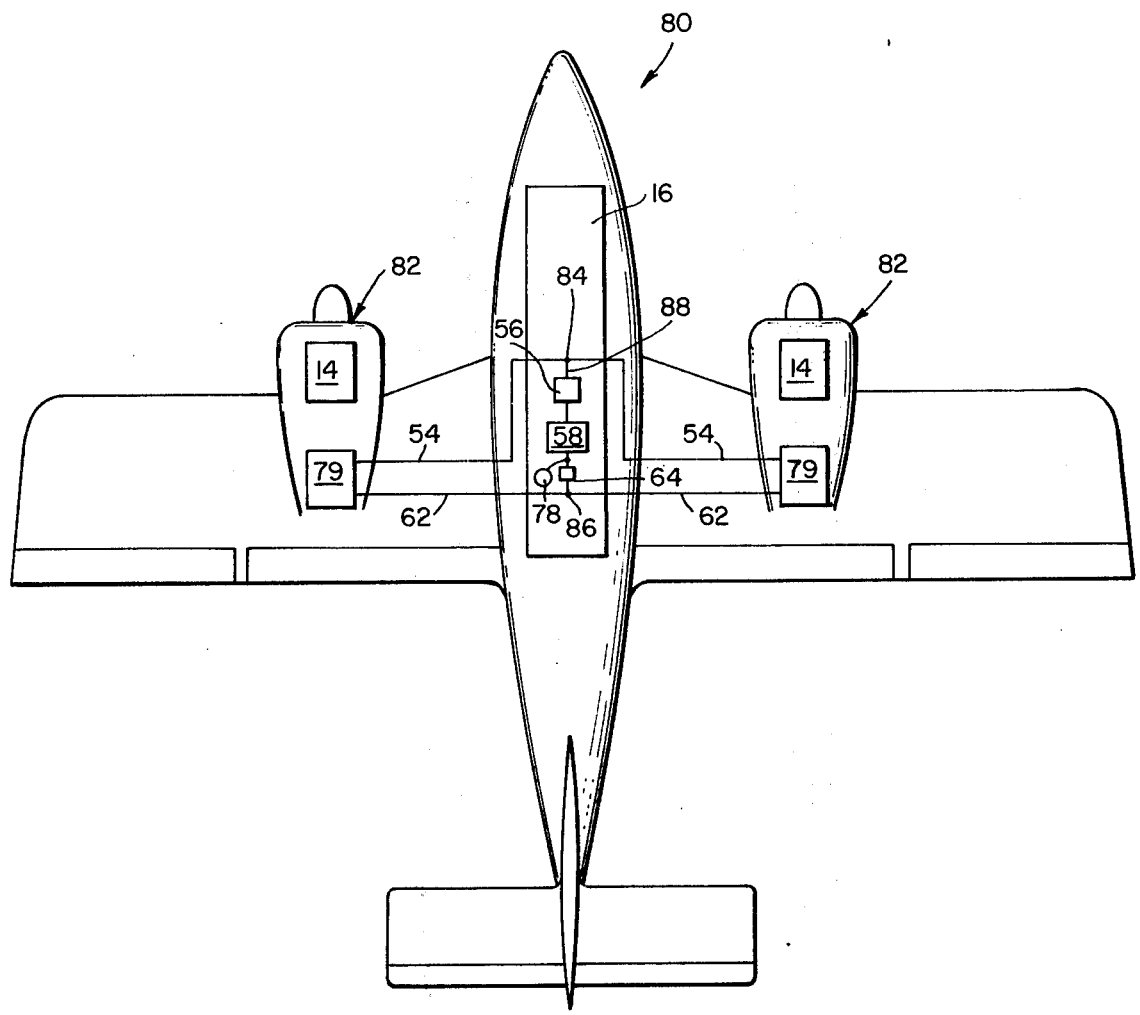

The advantages of the air conditioning system of this invention will be readily apparent when the following specification is read in conjunction with the appended drawings, wherein:

FIG. 1 is a schematic drawing of an air conditioning system in accordance with this invention; and FIG. 2 is a schematic drawing showing the coupling of two air conditioning systems of this invention in a twin engine airplane.

Referring now to FIG. 1, an air conditioning system in accordance with this invention is illustrated and is shown interposed between an engine air intake 12 and the intake manifold of the airplane's propulsion engine 14, preferably an internal combustion engine. The air conditioning system provides cooling for the air in an enclosure 16 which is preferably the cabin of the airplane.

The principal components of the air conditioning system are a turbocompressor 18 comprising a turbine 20 and compressor 22 mounted for rotation on a shaft 24, and a water chiller assembly 26. Atmospheric air at generally ambient temperature and pressure is drawn into the engine air intake 12. This air is transported through a conduit 28, which preferably has a suitable air filter 30 interposed therein, to a junction 32. The junction 32 is connected by a conduit 34 through a primary throttle control valve 36 to the turbine 20 and by a conduit 38 through a secondary throttle control valve 40 to a junction 42. During normal air conditioning operating conditions, the secondary throttle control valve 40 is closed and the air passes through the conduit 34 to the turbine 20, controlled by the primary throttle control valve 36. Operation of the secondary throttle control valve 40 will be explained subsequently herein.

The air is expanded in the turbine 20 so that it is substantially reduced in both temperature and pressure in a manner well known to those skilled in the art. This expanded air is passed through a conduit 44 to the water chiller assembly 26 wherein it cools circulating water in a manner which will be described.

The expanded air, warmed by the heat absorbed in the water chiller, passes through a conduit 46 to the compressor 22. The compressor 22 is mounted on the shaft 24 with the turbine 20 so that it is powered solely by the turbine. No additional power is supplied to the compressor in raising the pressure of the air fed thereto. Due to thermodynamic frictional losses of energy, the turbine 20 is unable to provide sufficient power to the compressor 22 to permit it to raise the pressure of the air to the ambient atmospheric pressure. However, this degree of compression is not required. The compressor is connected through a conduit 48 to the junction 42 which, in turn, is connected through a conduit 50 to the intake manifold of the engine 14. As is well known, manifold pressure is substantially beneath ambient atmospheric pressure so that the compressor 22 is easily able to raise the air to the pressure at the engine's intake manifold.

A suitable working fluid 52, which may be water, is transported from the water chiller assembly 26 through a pipe 54, the water being propelled by a water pump 56 to a cabin heat exchanger 58 through which cabin air is circulated by a blower 60. The heat exchanger may be of any suitable type capable of transferring heat between a gas and a liquid. In cooling the recirculated cabin air, the water is heated in the heat exchanger 58 and is returned to the water chiller through a pipe 62. If desired, a water filler 64 may be interposed in the pipe 62.

The water chiller assembly 26 is substantially a heat exchanger and is preferably oriented to provide a generally downward flow of water and a generally upward flow of air therethrough. Accordingly, the pipe 62 carrying water to the water chiller assembly 26 enters at an upper portion of the water chiller assembly 26 while the pipe 54 carrying water from the water chiller assembly is connected at a lower portion thereof. Conduit 44 carrying air from the turbine 20 to the water chiller assembly 26 is attached at the lower portion of the water chiller assembly while the conduit 46 carrying air from the water chiller assembly to the compressor 22 is connected at the upper portion.

A suitable nozzle 66 is provided at the end of the pipe 62 so that water may be sprayed into the water chiller assembly 26, falling on an evaporation matrix or core 68. The core 68 preferably consists of a large number of small pieces of non-absorbent material such as Excelsior or McMahan or Berl Saddles, having a shape that will provide a maximum amount of surface area for the distribution of water thereon. This configuration will optimize the cooling of the water as it drips through the core in a manner well known to those skilled in the art.

As the water drips downwardly through the core 68, the cool, low pressure air expanded in the turbine 20 is flowing upwardly through the core to provide cooling for the water in two highly effective manners. Because the air is at a lower temperature than the water, heat will be transferred from the water to the air. However, even greater cooling will result from another phenomenon. Because the pressure of the air has been substantially reduced, generally to a pressure of about 5.5 PSIA in the preferred embodiment, its capacity to absorb water vapor is greatly enhanced; air at this pressure can hold about 208 grains of water per pound of air compared to 78 grains of water per pound of air at atmospheric pressure, both figured at a temperature of 60° F. Thus a substantially greater amount of water in the water chiller assembly 26 will evaporate than could be vaporized at atmospheric pressure at the same temperature. Because of the amount of heat required to evaporate one pound of water is about 1000 BTU and because the air in the water chiller assembly is still substantially cooler than the water, the evaporation of water in the core 68 substantially lowers the temperature of the water 52.

After leaving the core 68, the cooled water 52, now at a temperature substantially below the cabin air temperature, about 45° F in the preferred embodiment, is collected at the bottom of the water chiller assembly 26 for removal to the cabin heat exchanger 58 through the pipe 54 in the manner previously described. Because evaporated water is withdrawn from the water chiller assembly 26 in the air passing through the conduit 46 and eventually entering the engine 14, it is necessary to monitor and control the quantity of water in the system. Accordingly, a water level sensor 70 is provided in the water chiller assembly 26. As long as sufficient water is collected at the bottom of the water chiller assembly, the flow of water through the pipe 54, cabin heat exchanger 58 and pipe 62 will be continuous, producing no air gaps which would impede system operation. However, after sufficient evaporation has occurred so that the water level becomes too low, air might be permitted to enter the pipe 54 which would impede or possibly terminate operation of the water loop and heat may no longer be removed from the cabin heat exchanger 58. Accordingly, when the water level drops to a predetermined point, the water level sensor sends an appropriate signal, if desired through a central electrical control 72, to a water level control valve 74.

The water level control valve 74 is interposed in a pipe 76 which connects a water tank 78 to the pipe 62. The water tank 78 may be either pressurized or vented as desired and serves as a water supply for replacing the water which is evaporated in the core of the water chiller assembly 26. The water level sensor 70 will assure that water is fed from the water tank 78 at a rate sufficient to replace all of the water which is evaporated. The water tank 78 may be of any suitable size required to replace all the water anticipated to be evaporated during the period between servicings of the system.

During normal operation, when the airplane is either on the ground or in the air, operation of the engine 14 causes its intake manifold to be at a sub-atmospheric pressure so that air is drawn into the engine air intake 12 and filter 30. Because the secondary throttle control valve 40 is fully closed during low power operation, throttling of the engine is controlled by the primary throttle control valve 36 and all intake air is passed through the air conditioning system.

The air is expanded and cooled in the turbine 20, which action also serves to drive compressor 22. The expanded cooled air is passed through the water chiller assembly 26 to withdraw substantial amounts of heat from water circulated therethrough in the manner previously described. The heated air, still at low pressure, passes through the conduit 46 to the compressor 22 where it is increased to a pressure suitable for entry into the intake manifold of the engine 14. It should be noted that because air fed to the engine must be "throttled" or reduced in energy in being fed to the engine, the interposing of the air conditioning system 10 simply uses this otherwise wasted energy, thus requiring substantially no added energy use except for that needed to drive the pump 56 and blower 60.

During high power requirements of the engine, such as when the engine is operating at high power levels necessary for operation at speeds much greater than cruising speed, or during takeoff and high altitude operation, the air intake requirements of the engine are such that it is no longer desirable to pass the engine intake air through the air conditioning system. During these operating conditions, the secondary throttle control valve 40 is activated so that air passes from the engine air intake 12 through the secondary throttle control valve 40 and through the conduit 50 to the intake manifold of the engine 14, thus reducing or even terminating air flow to the air conditioning system. It will be noted that during flight, such operating conditions generally occur under emergency conditions or when the airplane is operating at high altitude and air conditioning is not desired in any event.

In accordance with this invention, the principal cooling components of the air conditioning system are located in the engine compartment of the airplane, separated from the cabin by the fire wall (not shown). The pipes 54 and 62 connect these components with the cabin heat exchanger 58 to which water is pumped through the fire wall by the water pump 56. The cooled water passing through the cabin heat exchanger 58 cools air which is blown through the heat exchanger by the blower 60. The blower 60 may be controlled manually or thermostatically from central electrical control 72 so that it operates to blow air through the heat exchanger 58 only when cooling thereof is required.

The air conditioning system of this invention may be utilized in any vehicle having an internal combustion engine which develops a sufficiently low pressure at its intake manifold and may be utilized on a single engine airplane. On a multiple engine airplane, the air conditioning system may be utilized in connection with one engine or a complete air conditioning system, each smaller in capacity, may be coupled to each of two or more engines.

FIG. 2 illustrates a manner in which a pair of air conditioning systems 79, each operating in conjunction with an engine 14 of a twin-engine airplane 80 can be coupled to provide cooling through a single cabin heat exchanger 58.

Because a water loop is utilized to transport heat from the heat exchanger to the air conditioning system, only small diameter pipes or tubes 54, 62 need be run through the wings from engine compartments 82 to the airplane cabin or enclosure 16. The pipe 54 from each air conditioning system 79 is coupled at a junction 84 and the pipe 62 from each air conditioning system is coupled at a junction 86. A pipe 88 runs from the junction 84 to the junction 86 through the water pump 56, the cabin heat exchanger 58 and the water filter 64. The water tank 78 is connected to the pipe 88 between the heat exchanger 58 and water filter 64 in the same manner as shown in FIG. 1. Thus, two air conditioning systems can feed a single heat exchanger operated by a single water pump and using a single auxiliary water supply to replenish both systems.

We claim:
1. In combination:
an enclosure containing air;
an engine having an air intake source of air at substantially ambient pressure;
turbine means for receiving air from the source and expanding the air to reduce its temperature and pressure;
a first heat exchanger means for receiving air from the turbine means for cooling a working fluid in the heat exchanger;
compressor means driven by the turbine means for compressing air from the heat exchanger and feeding the air to the engine air intake;
a second heat exchanger;
means for circulating working fluid between the first and second heat exchangers; and
means for circulating air from the enclosure through the second heat exchanger.

2. The combination of claim 1 including valve means interposed between the source of air and said turbine means for controlling the flow of air to the engine air intake.

3. The combination of claim 2 wherein said engine operates over a range of power outputs and including bypass means connected between the source of air and said engine air intake and an additional valve means interposed in the bypass means for controlling the flow of air to said engine air intake above a predetermined power output.

4. The combination of claim 1 wherein said first heat exchanger means comprises a chamber, means for spraying said working fluid into the chamber, and means for passing the air from the turbine means through the chamber to evaporate a portion of said working fluid for cooling the remainder of said working fluid in the chamber.

5. The combination of claim 4 wherein said working fluid is water.

6. The combination of claim 4 including reservoir means for holding additional working fluid, and control means for replacing evaporated working fluid from the reservoir means.

7. The combination of claim 4 wherein the chamber of said first heat exchanger means includes a core of structures for carrying said working fluid on surfaces thereof.

8. An air conditioning system for a vehicle having an enclosure containing air, a propulsion engine, and valve means for controlling the flow of air to the engine, said system comprising a heat exchanger, means for circulating air from the enclosure through the heat exchanger, a working fluid, means for circulating the working fluid through the heat exchanger for removing heat from the enclosure air, an additional heat exchanger, means for circulating the working fluid through the additional heat exchanger, turbine means for receiving air from the valve means, reducing its temperature and pressure and passing it to the additional heat exchanger for removing heat from the working fluid by evaporating a portion thereof, and compressor means driven by the turbine means for receiving air from the additional heat exchanger, increasing its pressure and feeding it to the engine.

9. An air conditioning system as in claim 8 wherein said valve means comprises a first control valve for controlling flow of air to the engine through said system and a second control valve for controlling flow of air to the engine bypassing said system whenever the engine is operating to produce more than a predetermined power output.

10. An air conditioning system as in claim 8 wherein said additional heat exchanger comprises a chamber, means for spraying said working fluid into the chamber, means for passing the air from the turbine means through the chamber, and a core of structures mounted in the chamber for carrying said working fluid on surfaces thereof to enhance the vaporization of said portions thereof.

11. An air conditioning system for an airplane having a plurality of propulsion engines, valve means for controlling the flow of air to each engine, and an enclosure to be cooled, said system comprising a heat exchanger, means for circulating air from the enclosure through the heat exchanger, a working fluid, means for circulating the working fluid through the heat exchanger for removing heat from the enclosure air, a plurality of additional heat exchangers, one additional heat exchanger operatively associated with each propulsion engine, means for dividing the flow of the working fluid and circulating some of the working fluid through each additional heat exchanger, turbine means operatively associated with each propulsion engine for receiving air from the valve means, reducing its temperature and pressure and passing it to its associated additional heat exchanger for removing heat from the working fluid by evaporating a portion thereof, and compressor means driven by each turbine means for receiving air from an additional heat exchanger, increasing its pressure and feeding the air to its associated propulsion engine.

12. A method of cooling a fluid in a structure having an engine with an air intake, said method comprising the steps of circulating the fluid through a heat exchanger, passing air at a generally ambient pressure through a turbine to lower the temperature and pressure of the air, passing the air through the heat exchanger to evaporate a portion of the fluid and withdraw heat from the remainder of the fluid in the heat exchanger, passing the air through a compressor driven by the turbine to raise the pressure of the air, and introducing the air into the air intake of the engine.

13. The method of claim 12 including the additional steps of passing the air through a controllable valve before its passage through the turbine and controlling the valve to regulate flow of air to the air intake of the engine.

14. The method of claim 12 including the additional step of causing generally ambient pressure air to flow directly into the air intake of the engine when the engine is operating above a predetermined operating speed.

* * * * *